Patented Nov. 29, 1932

1,889,331

UNITED STATES PATENT OFFICE

JOSEPH R. INGRAM, OF NITRO, WEST VIRGINIA, ASSIGNOR TO THE RUBBER SERVICE LABORATORIES COMPANY, OF AKRON, OHIO, A CORPORATION OF OHIO

AGE RESISTING VULCANIZED RUBBER PRODUCT AND PROCESS OF MANUFACTURING SAME

No Drawing.    Application filed October 10, 1930.    Serial No. 487,912.

The present invention relates to a process for the manufacture of vulcanized rubber and the products obtained thereby. More particularly, the invention is directed to an improved process of manufacturing vulcanized rubber and the like wherein there is incorporated into a rubber mix of vulcanization characteristics, a compound of the type hereinafter disclosed whereby anti-oxidant or age resisting properties are developed in the vulcanized rubber product. The invention will be understood from the following description and examples wherein a preferred mode of operating the invention is fully set forth and described.

It is well known that rubber deteriorates rapidly when exposed to air, heat and sunlight and that such deterioration is characterized by a loss in the tensile strength, resiliency and other desirable properties of the material. It has now been found according to the present invention that such deterioration can be very greatly lessened if there be incorporated in the rubber mix a compound of the class hereinafter set forth.

The age resisting characteristics of a vulcanized rubber product can be readily ascertained by subjecting the vulcanized product to an accelerated aging test wherein portions of the cured rubber product are subjected in a bomb to the action of oxygen under pressure and maintained for several hours at an elevated temperature. The treated samples are then examined and tested and the results so obtained compared with similar results obtained by testing the unaged vulcanized stock. The deterioration in properties suffered as a result of from 18 to 36 hours of the oxidation treatment is indicative of the result that would normally be expected from that particular stock during several years of natural aging. Such a test is known as the Bierer-Davis aging test.

The new class of anti-oxidant or age resisting materials which have been found upon incorporation into a rubber stock to impart such excellent age resisting qualities to the vulcanized product that portions thereof, when subjected to the artificial aging tests described, undergo only a relatively small loss in tensile strength and other qualities, comprise a reaction product of a diazotized aryl and an aryl amine.

One method whereby one of the preferred class of anti-oxidants, for example the reaction product of diazotized aniline and diphenylamine, may be prepared is as follows. The reaction involved in the preparation of this compound it is believed is as follows:

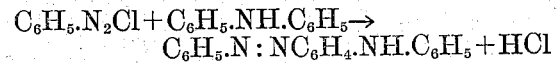

$C_6H_5.N_2Cl + C_6H_5.NH.C_6H_5 \rightarrow$
$\qquad C_6H_5.N : NC_6H_4.NH.C_6H_5 + HCl$ Substantially one molecular proportion of diphenylamine is dissolved in a convenient quantity of a solvent, for example alcohol, and suitably agitated at a temperature of substantially 0 to 5° C. while a solution prepared by diazotizing aniline is added until an excess of the diazotized solution has been added. The product is allowed to crystallize out by evaporation, and may be further purified if desirable by recrystallizing from a suitable solvent, for example alcohol. The material prepared as described was compounded in the well known manner in a rubber stock comprising

|  | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| Anti-oxidant described above | 1 |

The stock thus formed was then vulcanized by heating sheets of the said stock in a press in the well known manner for different periods of time at the temperature given by 40 pounds of steam pressure per square inch. Portions of the stock cured in the manner as described were then artificially aged by heating in an oxygen bomb in the manner described for 36 hours at a temperature of 70° C. and an oxygen pressure of 300 pounds per square inch. A comparison between the tensile and modulus properties of the aged and unaged vulcanized rubber product so obtained is given in Table I.

Table I

| Cure minutes | Hours aged | Modulus of elasticity in lbs/in² at elongations of— | | Tensile at break in lbs/in² | Ultimate elongation per cent |
|---|---|---|---|---|---|
| | | 300% | 500% | | |
| 30 | 0 | 785 | 2,200 | 2,855 | 575 |
| 30 | 36 | 710 | ---- | 1,480 | 450 |
| 60 | 0 | 1,135 | 3,010 | 4,435 | 635 |
| 60 | 36 | 1,115 | 2,310 | 2,690 | 550 |
| 90 | 0 | 1,493 | 3,615 | 4,650 | 595 |
| 90 | 36 | 1,315 | 2,530 | 2,530 | 590 |

The data set forth in Table I show that the preferred class of anti-oxidant materials, for example the reaction product of diazotized aniline and diphenylamine possess particularly desirable anti-oxidant properties.

Another example of the preferred class of anti-oxidants was prepared by reacting substantially one molecular proportion of diazotized p,p'-diamino-diphenylmethane with substantially two molecular proportions of diphenylamine in a manner analogous to that described above. It is believed the reaction involved in the preparation of this material is as follows:

$ClN_2.C_6H_4.CH_2.C_6H_4.N_2Cl + 2C_6H_5.NH.C_6H_5 \rightarrow$
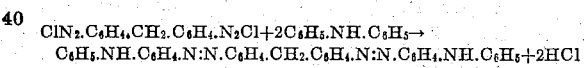
$C_6H_5.NH.C_6H_4.N:N.C_6H_4.CH_2.C_6H_4.N:N.C_6H_4.NH.C_6H_5 + 2HCl$ The product thus prepared was compounded in a rubber stock comprising

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| Anti-oxidant described above | 1 |

The stock was then vulcanized by heating for different periods of time at the temperature given by 40 pounds of steam pressure per square inch. Portions of the stock thus cured were then artificially aged by heating portions of said stock in an oxygen bomb in the manner hereinbefore described for 36 hours at a temperature of 70° C. and under an oxygen pressure of 300 pounds per square inch. A comparison between the tensile and modulus properties of the aged and unaged vulcanized rubber product is given in Table II.

Table II

| Cure minutes | Hours aged | Modulus of elasticity in lbs/in² at elongations of— | | Tensile at break in lbs/in² | Ultimate elongation per cent |
|---|---|---|---|---|---|
| | | 300% | 500% | | |
| 30 | 0 | 737 | 1,970 | 2,913 | 630 |
| 30 | 36 | 682 | ---- | 1,253 | 440 |
| 60 | 0 | 1,188 | 2,910 | 3,695 | 600 |
| 60 | 36 | 1,000 | ---- | 1,705 | 465 |
| 90 | 0 | 1,390 | 3,285 | 3,830 | 565 |
| 90 | 36 | 1,185 | ---- | 1,685 | 420 |

From the data set forth in Table II it is apparent that the reaction product of diazotized p,p'-diamino-diphenylmethane and diphenylamine possess the desirable anti-oxidant properties of the preferred class of compounds.

As a further example of operating the present invention, a compound was prepared by reacting substantially one molecular proportion of diazotized alpha-naphthylamine with substantially one molecular proportion of alpha-naphthylamine in the manner described. It is believed the compound formed has the following formula:

$$C_{10}H_7.N : N.C_{10}H_6.NH_2$$

This product, when compounded in a rubber mix and tested in the manner hereinbefore described, showed the desirable anti-oxidant qualities of the preferred class of materials.

In like manner, other diazotized aromatic amines may be reacted with various amines and preferably aromatic amines thus forming further examples of the preferred class of anti-oxidants. The reaction product of diazotized aniline and aniline, the reaction product of diazotized aniline and alpha-naphthylamine, the reaction product of diazotized aniline and beta-naphthylamine, the reaction product of diazotized toluidine and diphenylamine, the reaction product of diazotized beta-naphthylamine and diphenylamine, the reaction product of diazotized benzidine and diphenylamine, the reaction product of diazotized benzidine and alpha-naphthylamine, and analogous compounds may be prepared in a manner analogous to that hereinbefore set forth and employed as anti-oxidants in a rubber stock of vulcanization characteristics.

In the examples hereinbefore set forth, diphenylguanidine was employed as the accelerator, because it is known that a stock wherein it is used possesses poor aging qualities which does not mask the effect of the anti-oxidant employed. In fact, a tread stock of the composition employed in the examples cured in the presence and under the influence of diphenylguanidine as an accelerator, but containing no anti-oxidant, melts down to a shapeless mass incapable of test when subjected to the aging test described. Other accelerators could, of course, have been employed resulting in different tensile and modulus figures than those hereinbefore set forth but still exhibiting the desirable anti-oxidant properties of the preferred class of compounds.

From the data hereinbefore set forth it is apparent that the preferred class of compounds comprises an important class of antioxidants which have been employed advantageously in a rubber stock.

The present invention is limited solely by the claims attached hereto as a part of the present specification wherein it is intended to claim the invention as broadly as possible in view of the prior art.

What is claimed is:

1. The process of vulcanizing rubber which comprises heating rubber and sulfur in the presence of an anti-oxidant comprising a reaction product of a diazotized aryl amine and a secondary aryl amine prepared at a temperature below the decomposition point of said diazotized amine.

2. The process of vulcanizing rubber which comprises heating rubber and sulfur in the presence of an anti-oxidant comprising a reaction product of a diazotized aryl amine and diphenylamine prepared at a temperature below the decomposition point of said diazotized amine.

3. The process of vulcanizing rubber which comprises heating rubber and sulfur in the presence of a reaction product of substantially one molecular proportion of diazotized aniline and substantially one molecular proportion of diphenylamine prepared at a temperature below the decomposition point of said diazotized aniline.

4. The vulcanized rubber product prepared by heating rubber and sulfur in the presence of an anti-oxidant comprising a reaction product of a diazotized aryl amine and a secondary aryl amine prepared at a temperature below the decomposition point of said diazotized amine.

5. The vulcanized rubber product prepared by heating rubber and sulfur in the presence of an anti-oxidant comprising a reaction product of a diazotized aryl amine and diphenylamine prepared at a temperature below the decomposition point of said diazotized amine.

6. The vulcanized rubber product prepared by heating rubber and sulfur in the presence of the reaction product of substantially one molecular proportion of diazotized aniline and substantially one molecular proportion of diphenylamine prepared at a temperature below the decomposition point of said diazotized aniline.

7. The process of vulcanizing rubber which comprises heating rubber and sulfur in the presence of an anti-oxidant comprising a reaction product of diazotized aniline and diphenylamine prepared at a temperature below the decomposition point of said diazotized aniline.

8. The vulcanized rubber product prepared by heating rubber and sulfur in the presence of an anti-oxidant comprising a reaction product of diazotized aniline and diphenylamine prepared at a temperature below the decomposition point of said diazotized aniline.

In testimony whereof I hereunto affix my signature.

JOSEPH R. INGRAM.

CERTIFICATE OF CORRECTION.

Patent No. 1,889,331.                                November 29, 1932.

JOSEPH R. INGRAM.

It is hereby certified that error appears in the printed specification of the above numbered patent requiring correction as follows: Page 1, line 54, after "aryl" first occurrence insert the word "amine"; and that the said Letters Patent should be read with this correction therein that the same may conform to the record of the case in the Patent Office.

Signed and sealed this 28th day of February, A. D. 1933.

M. J. Moore, (Seal)                                Acting Commissioner of Patents.